United States Patent [19]

Nierescher et al.

[11] Patent Number: 5,739,666
[45] Date of Patent: Apr. 14, 1998

[54] RECHARGEABLE BATTERY PACK FOR BATTERY POWERED DEVICES

[76] Inventors: David S. Nierescher, 12851 SE 76 Pl., Newcastle, Wash. 98056; David E. Jones, 135 N. Deer Run La., Layton, Utah 84040; Jeffrey I. Raper, 6051 S. 3050 West, Roy, Utah 84067

[21] Appl. No.: 658,256

[22] Filed: Jun. 3, 1996

[51] Int. Cl.$^6$ .................................................. H01M 10/46
[52] U.S. Cl. ............................................................. 320/2
[58] Field of Search ........................ 320/2, 5; 439/500, 439/467

[56] References Cited

U.S. PATENT DOCUMENTS

| | | | |
|---|---|---|---|
| 4,670,701 | 6/1987 | Sako et al. | 320/2 |
| 5,006,779 | 4/1991 | Fenne et al. | 320/2 |
| 5,350,317 | 9/1994 | Weaver et al. | 439/500 |
| 5,475,626 | 12/1995 | Viletto | 361/680 X |
| 5,536,590 | 7/1996 | Cheiky | 429/7 |

*Primary Examiner*—Edward Tso
*Attorney, Agent, or Firm*—Christensen O'Connor Johnson & Kindness PLLC

[57] ABSTRACT

A rechargeable battery pack (10) for holding one or more batteries (19) and for connecting to an battery powered device (11). The battery pack batteries supplies electrical power to the peripheral device. The battery pack includes a case for holding at least one battery, a recharging circuit (57) connected to the at least one battery and disposed in the case and a plug (50) with prongs for electrically connecting the recharging circuit to an external source of electrical power. The plug rotates about a connection to the case from a first operational position having the plug mounted flush with the case and the prongs recessed in the case, to a second operational position with the prongs projecting from the case. The second and third operational positions of the plug are approximately orthogonal to the first operational position. The prongs are electrically connected to the recharging circuit in all operational positions. The battery pack also includes a discharging circuit (68) connected to the at least one battery and disposed within the case. A battery discharging arm (15) includes a discharging plug (61) and is rotatably connected to the case. The arm rotates from a first operating mode position having the arm rotated approximately flush with the case, to a second operating mode position with the arm projecting from the case. The first operating mode position of the arm enables the recharging circuit and disables the battery discharging circuit. The second operating mode position of the arm enables the battery discharging circuit and disable the recharging circuit.

13 Claims, 7 Drawing Sheets

5,739,666

RECHARGEABLE BATTERY PACK FOR BATTERY POWERED DEVICES

FIELD OF THE INVENTION

The present invention relates generally to rechargeable battery packs, and in particular, to rechargeable battery packs for external computer peripherals.

BACKGROUND OF THE INVENTION

Many computer peripheral devices, such as CD-ROMs, digital cassette tape storage and high density memory storage (Zip Drive by Iomega Corporation), are designed for supplementing computers with additional features and capabilities. These devices are particularly useful with laptop computers because the features they provide are prohibitively expensive if incorporated within the laptop. Designed for portability, laptop computers are limited by inaccessibility to a continuous power source or the life of the laptop batteries if no power source is available.

Some computer peripheral devices do not include batteries and must maintain connection to a continuous AC power source. Other peripheral devices include rechargeable batteries, thus providing operation of the device remote from a continuous power source. However, a battery recharger must accompany the batteries. A goal of producing portable external peripheral devices is light weight and ease of use. A device with an AC adapter plug, batteries and a battery recharger is cumbersome and heavy.

The present invention provides an improved solution.

SUMMARY OF THE INVENTION

The present invention provides a rechargeable battery pack for holding one or more batteries and for connecting to external computer peripherals or other battery powered devices. When connected to the computer peripheral, the battery pack supplies electrical power from the batteries for operation of the peripheral device.

The battery pack includes a case for holding at least one battery, a recharging mechanism for recharging the at least battery, a device powering mechanism for powering the battery powered device with the at least one battery and an operation control mechanism for controlling the recharging mechanism and the device powering mechanism. The operation control mechanism includes a first operating mode for enabling the recharging mechanism and for disabling the device powering mechanism and a second operating mode for connecting the device powering means and for disabling the recharging mechanism.

In accordance with other aspects of the present invention, the operation control mechanism includes a controlling arm rotatably connected to said case for selecting the operating modes, wherein said arm is rotatable from a first position for activating the first operating mode to a second position for activating the second operating mode.

In accordance with other aspects of the present invention, the recharging means includes a plug with two prongs spaced apart from one another and generally parallel to each other, wherein the plug is connectable to an AC power source.

In accordance with other aspects of the present invention, a battery discharging circuit is connected between the device powering mechanism and the at least one battery for regulating the output of the at least one battery to the device powering mechanism.

In accordance with further aspects of the present invention, the battery pack includes a securing mechanism for temporarily securing the battery pack to the battery powered device, wherein the securing mechanism includes a rear latch for securing the battery pack to a rear ridge of the battery powered device.

In accordance with still further aspects of the present invention, the securing mechanism includes at least one opposing ridge for mounting against ridges on the top of the battery powered device for limiting battery pack motion relative to the battery powered device.

In accordance with still other aspects of the present invention, cooling vents on the case provide airflow through the case for cooling the components inside the case and exhausting gasses within the case.

In accordance with yet other aspects of the present invention, an LED is connected to the battery for illuminating when the battery is fully charged or when the battery is being charged.

As will be readily appreciated from the foregoing summary, the invention provides a new and improved apparatus for providing a reusable battery power source for battery powered devices. The invention also provides a battery pack that is removably mounted to battery powered devices, thus generating a greater ease in use.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
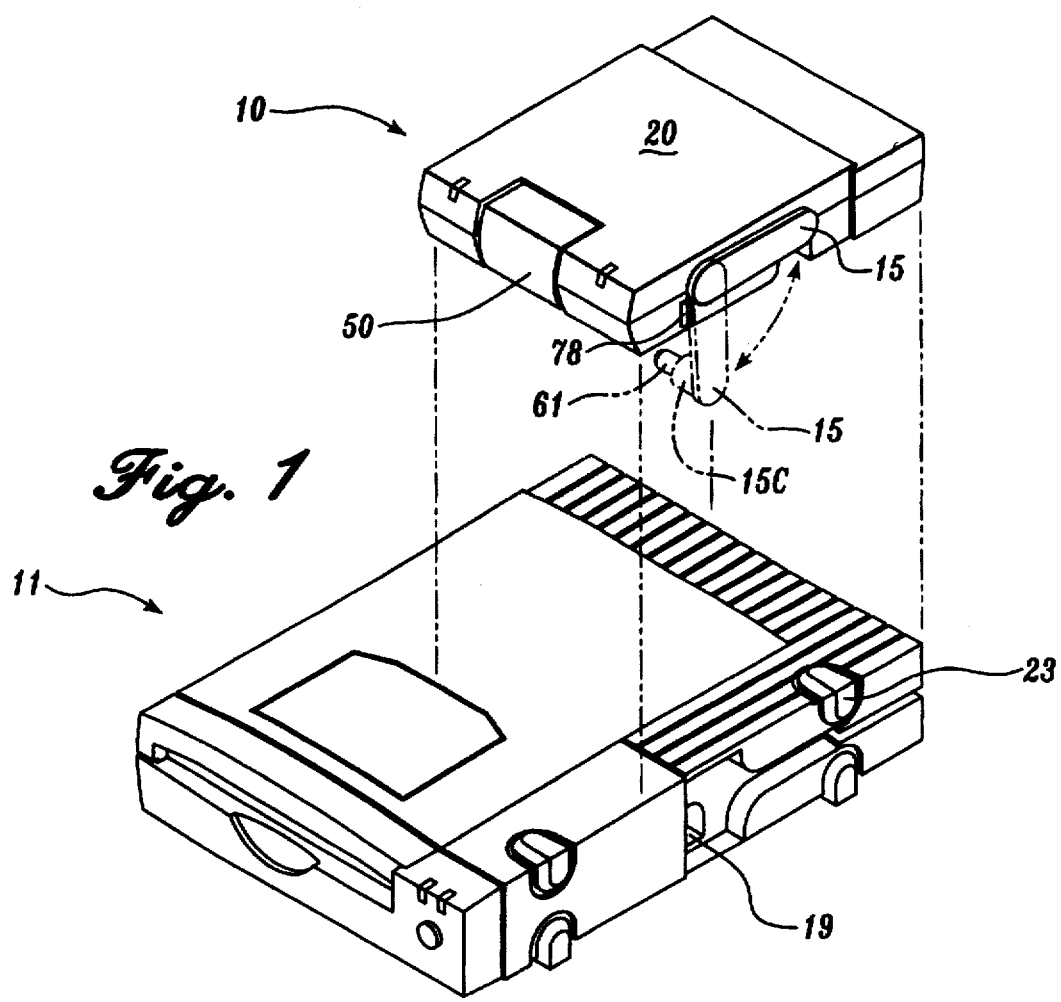
FIG. 1 is a perspective view of a preferred embodiment of the present invention.
Figure 2:
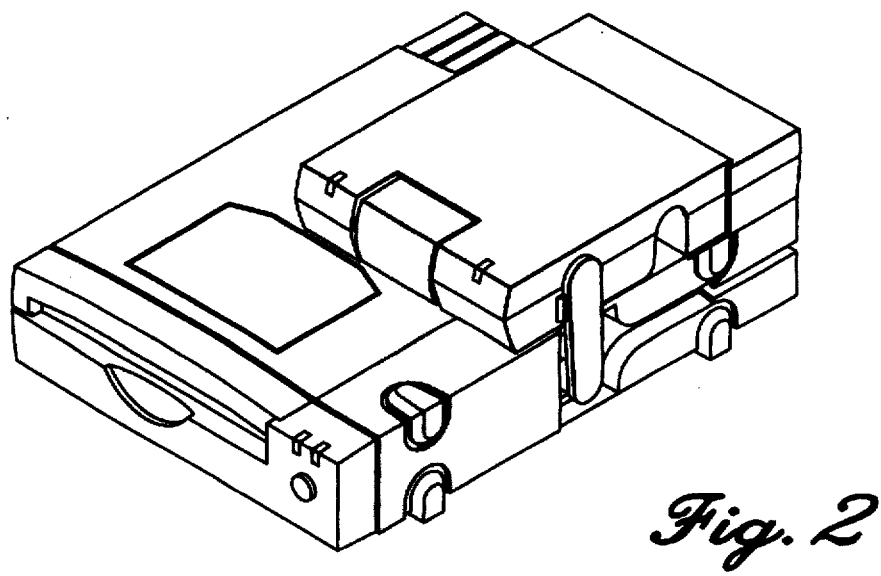
FIG. 2 is a perspective view of the present invention coupled to a computer peripheral device.

FIG. 1 illustrates a preferred embodiment of a battery pack 10 in accordance with the present invention. The battery pack 10 stores a battery or batteries 19, and removably connects to a computer peripheral or other battery operated device 11, for example, a Zip Drive produced by Iomega Corporation. The battery pack 10 includes a mechanical connection system for connecting the battery pack 10 to the device 11, and circuits for recharging the batteries 19 and discharging the batteries 19 to the device 11. A switching device controls operation of the circuits. FIG. 2 illustrates the battery pack 10 electrically and mechanically coupled to the device 11.

The mechanical connection system includes components protruding externally from the battery pack 10. The protruding components include a securing flap 18, a flap-locking tab 35 and a rotating battery discharging switch 15. Other components of the mechanical connection system are described in more detail below.

The battery pack 10 includes a hollow case with a top portion 20 coupled to a base portion 21. Preferably, the top and bottom portions 20 and 21 are formed from a polymeric material, such as thermoplastic. The top portion 20 may be coupled to the bottom portion 21 by any method known in the art, such as snap fittings, adhesives, fasteners and plastic welding.

Figure 3A:
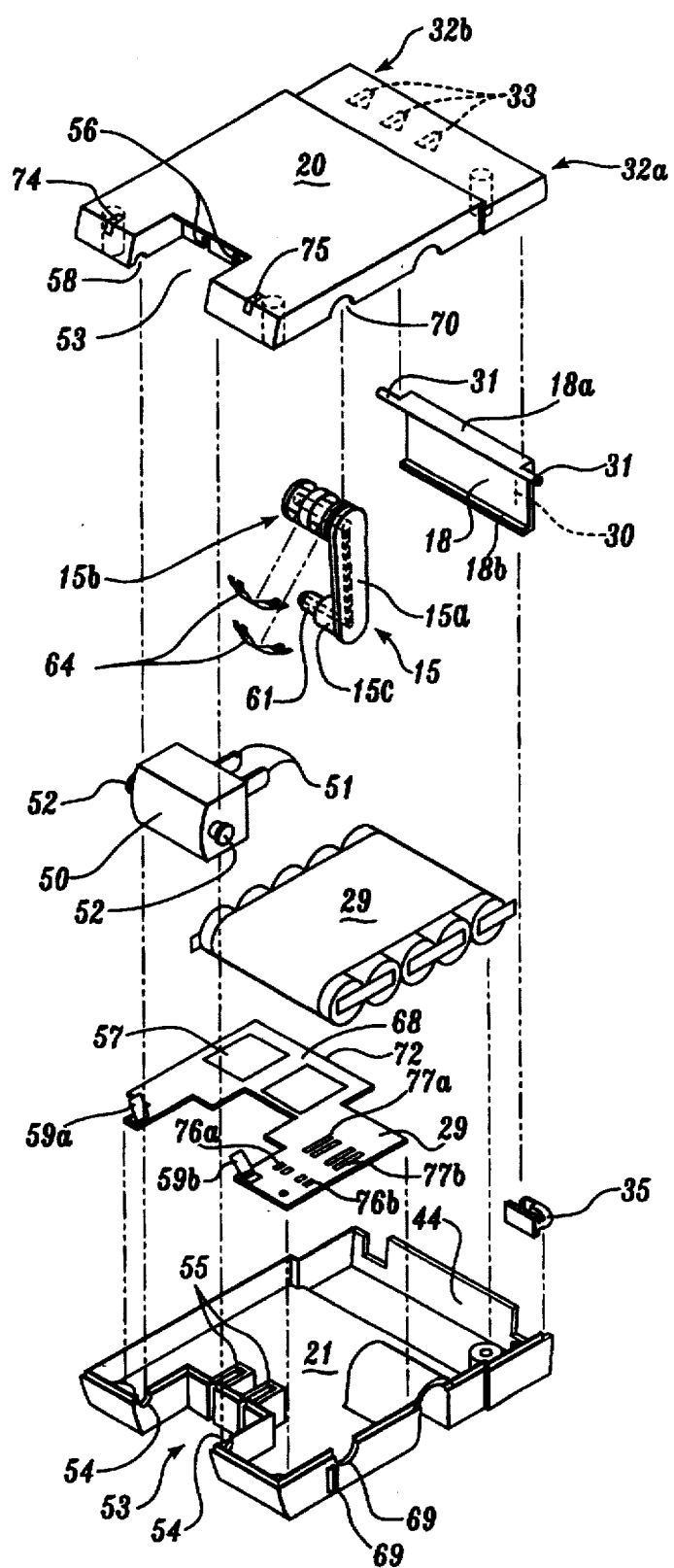
FIG. 3A is an exploded view of the present invention.

As shown in FIG. 3A, the inside of the battery pack 10 includes, amongst other things, an inner portion 15b of switch 15, a recharging circuit 57, a battery discharging circuit 68 and a battery unit 19. Structural items located on the inside of top and bottom portions 20 and 21 support the internal components of the battery pack 10.

The connection system mechanically connects the battery pack to the device 11. The mechanical features include the rotatable battery discharging switch 15 with a female charge connector 61, the securing flap 18 with the flap-locking tab 35, an opposing ridge 16, one longitudinal ridge 76 and a wedge 78. As shown in FIG. 1, the rotating battery discharging switch 15 externally includes an arm portion 15a. The arm portion 15a is rotatably mounted at a first end of the arm portion 15a through a first side of battery pack 10. The first side corresponds to the side of the device that includes the device's electrical mail-receiving connector 19. The point of rotation for the arm portion 15a is forwardly located on the battery pack 10. A cylindrical connector mount 15c has the female charge connector 61 connected at a first end of the mount 15c. A second end of the connector mount 15c opposite the first end of the mount 15c is connected at a second end of the arm portion 15a. The connector mount 15c and the female charge connector 61 are connected on the side of arm portion 15a facing the battery pack 10. The battery discharging switch 15 rotates in a lower semi-circular arm channel 69 located at the forward portion of the side wall on bottom portion 21 and an upper semi-circular arm channel 70 located on top portion 20 opposite from lower semi-circular arm channel 69. It is obvious to one of ordinary skill in the art that the discharging switch 15 may include an extendable plug with a switch or any variation thereof instead of the rotating plug as shown.

Approximately at the center of the first side of the battery pack 10 is an arm-receiving notch 14. When battery discharging switch 15 is rotated to a substantial parallel position with the length-wise dimension of the battery pack 10, arm-receiving notch 14 receives connector-mounting block 15c and a female charge connector 61. When the battery pack 10 is secured to the top of the device 11, the battery discharging switch 15 is rotated to a position to allow the female charge connector 61 to attach to the male receiving connector 19. When the female charge connector 61 and the male receiving connector 19 are connected properly, the battery discharging switch 15 is vertically positioned, substantially perpendicular to the battery pack 10 and device 11. As shown in FIGS. 1 and 3A, an arm stop 78 is located slightly forward and below the rotating position of the battery discharging switch 15. The arm stop 78 keeps the arm portion 15a from moving forward of the vertical position. The battery discharging switch 15 also provides some lateral, longitudinal and vertical stability when the battery pack 10 is mounted on top of the device 11. FIG. 1 illustrates the motion of the rotating battery discharging switch 15 from a stowed position (solid line) to a device connecting position (dashed line).

Figure 3B:
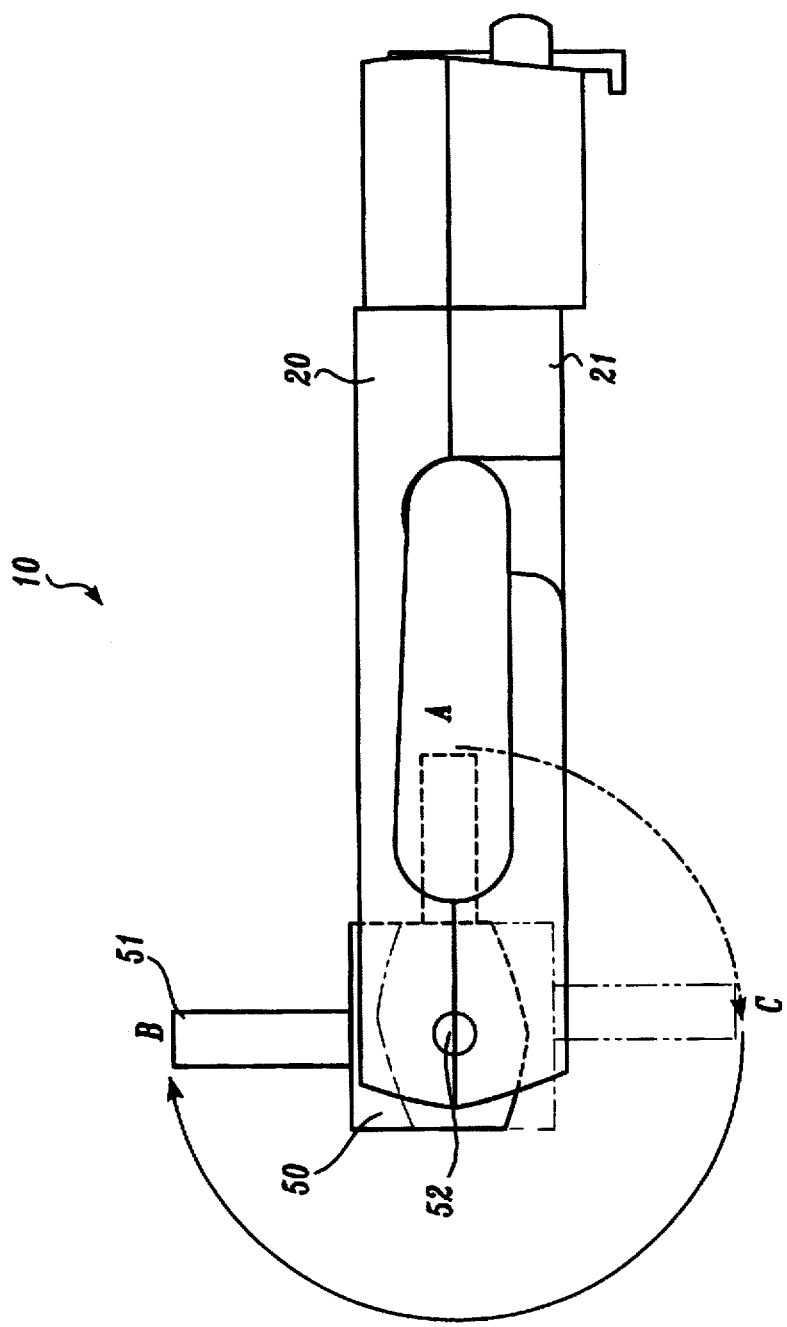
FIG. 3B is side view of the present invention.
Figure 4:
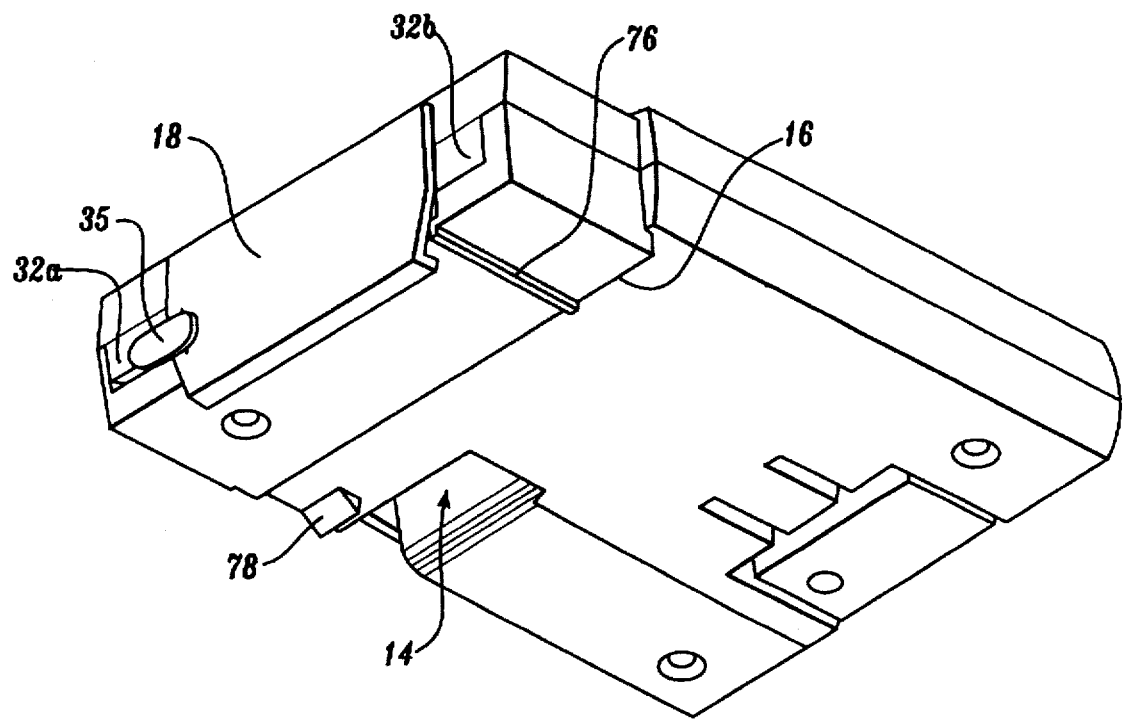
FIG. 4 is a perspective view of the underside of the present invention.
Figure 5:
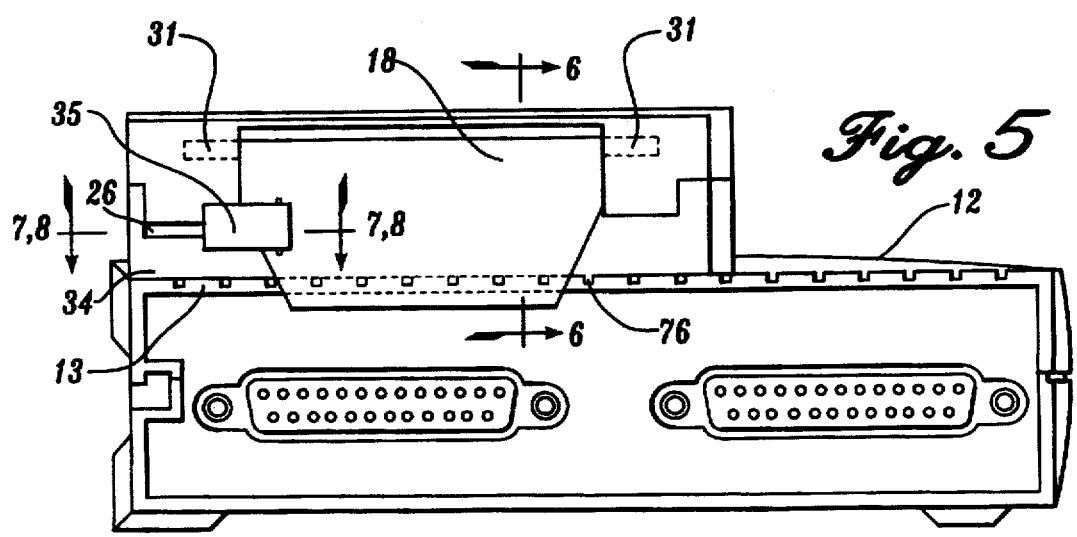
FIG. 5 is a rear view of the present invention coupled to a computer peripheral device.
Figure 6:
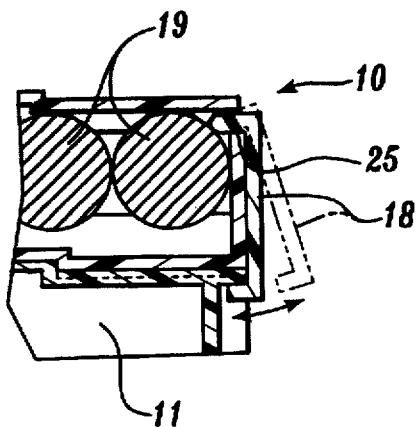
FIGS. 6–8 are cross-sectional views of a preferred embodiment of the present invention.

As shown in FIGS. 3–8, the component that provides the most stability for the battery pack 10 when it is mounted on the device 11 is the securing flap 18. The securing flap 18 is polygonal in shape with top and bottom perpendicular ridges 18a, b running along the top and bottom length-wise edges of the flap 18. Located on the top ridge 18a of the flap 18 are rounded knobs or hooks 31 that extend away from the flap 18 parallel to the flap's length-wise edge. Located on the outer surface of flap 18 is a flap-locking slot 30 parallel with the width dimension of the flap 18 and positioned near a first side of the flap 18. As shown in FIG. 4, the rear end of top portion 20 includes two retaining walls 32a, b located at the sides of the rear end of top portion 20 with no wall located in between the two walls 32a, b. A rear end wall 44 on bottom portion 21 is received between the retaining walls 32a, b of top portion 20. The rear ends of top and bottom portion 20, 21 provide two horizontal gaps 25, 26. The inside edges of retaining walls 32a, b, the top edge of wall 44, and the edge of top portion 20 between the retaining walls 32a, b define the first horizontal gap 25. As shown in FIG. 6, the first gap 25 receives the top ridge 18a of securing flap 18. Securing flap 18 is rotatably secured by the hooks 31 contacting the inner sides of corresponding retaining walls 32a, b and by three flap-support tabs 33 located at the rear end of the underside of top portion 20, see FIG. 3. When securing flap 18 is in a locked position, the bottom ridge 18b extends a distance below the base of bottom portion 21 approximately equal to the thickness of the rear horizontal ledge 13 of device 11.

As shown in FIGS. 4, 5, 7 and 8, the securing flap 18 is locked in place by the flap-locking tab 35. The flap-locking tab 35 includes an external button portion 36, an internal guide portion 37, a recessed neck 38 and a locking key 39. The neck 38 is vertically centered between the guide portion 37 and button portion 36 at one end of the tab 35. The second horizontal gap 26 is slightly wider than the neck 38 of the flap-locking tab 35 and is defined by the bottom edge of the hook-retaining wall 32 nearest the flap locking slot 30, a smaller wall 34 opposite wall 32a at the rear end of bottom portion 21, the side edge of wall 44 and the side wall of the bottom portion 21. An internal support wall 42 is mounted inside of bottom portion 21 parallel with the wall 44 and at a distance away from the wall 44 slightly greater than the width of the guide portion 37. The location of the support wall 42, the width of the second gap and the size of various other components allow the flap-locking tab 35 to move in a controlled horizontal movement within the second gap 26. The second gap 26 is located closest to the side of the securing flap 18 that contains the flap-locking slot 30.

Figure 7:
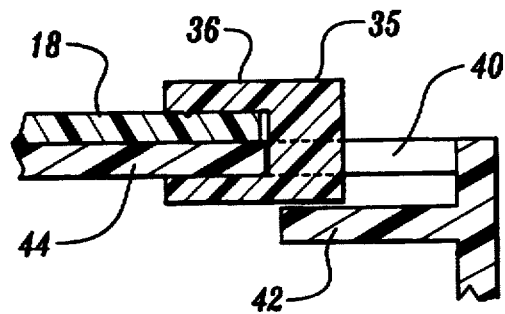
Figure 8:
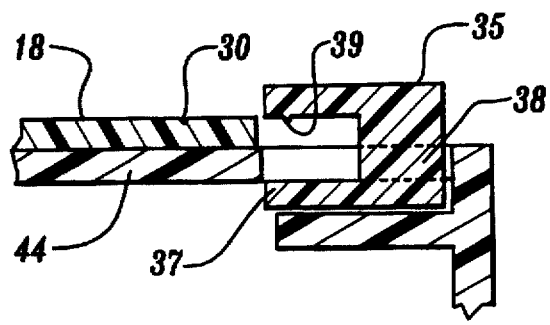

The external button portion 36 of the flap-locking tab 35 extends parallel to the wall 44 at a distance away from the wall 44 of bottom portion 21 approximately equal to the thickness of the securing flap 18. As shown in FIG. 7, the flap 18 is in contact with the wall 44 and the flap-locking tab 35 is positioned adjacent to securing flap 18 with the locking key 39 inserted into the flap-locking slot 30 for locking the flap 18 in position. Lateral movement of securing flap 18 is controlled by the hook-retaining walls 32 and rotation of the securing flap 18 away from wall 44 is controlled by the flap-locking tab 35.

Also shown in FIG. 4 are features of the connection system that provide more stability for the battery pack 10 when mounted on the top of the device 11. A first feature is an opposing ridge 16 located on the underside of bottom portion 21. For example, the top of the peripheral device 11 includes a horizontal ridge 12 located at the rear portion of the drive. Opposing ridge 16 when properly positioned opposes a horizontal ridge 12 of the peripheral device 11, thus stopping forward movements of the battery pack 10.

Another connection system feature includes a longitudinal ridge 76 mounted on the rear outside end of bottom portion 21. The ridge 76 starts at the rear of bottom portion 21 and extends longitudinally to the opposing ridge 16. The ridge 76 is sized to snugly fit into a corresponding recessed ridge on the rear top end of device 11. The snug fit provides significant lateral stability. A final stabilizing connection system feature is wedge 78. The wedge 78 is mounted on bottom portion 21 between arm receiving notch 14 and opposing ridge 16. The wedge 78 downwardly slopes towards the rear of the battery pack 10, thus butting up against the forward sloping edge of the top, rear standing pad 23 of the device 11, see FIG. 1. Thus, the wedge 78 reduces rearward movement of the battery pack 10 when mounted on the device 11. It can be appreciated by one of ordinary skill that various types of ridges may be used for a snug fit to the top of whatever device 11 the battery pack 10 couples to.

As shown in FIG. 3A, the recharging system includes a plug 50 rotatably attached to the forward portion of the top and bottom portions 20 and 21. The plug 50 includes two parallel plug prongs 51 acceptably long enough to be received by an AC power source outlet and a plug axle 52 connected to the prongs 51 inside the plug 50. The plug axle 52 extends out opposite sides of the plug 50 which are orthogonal to the plug prong side of the plug 50. A plug cavity 53 and a prong cavity 35 are centered at the front of bottom portion 21 and are shaped to receive the plug 50 and prongs 51 without obstructing either. The plug cavity 53 is also centered at the front of top portion 20.

The rotating motion of plug 50 is provided by plug axle 52 and semi-circular channels 54 and 58. The two sets of semi-circular channels 58 and 54 are located at the front portion of the top and bottom portion 20 and 21, respectively, along the side walls that generate the width dimension of the plug cavity 53. Semi-circular channels 54 receive the lower halves of the plug axles 52 and semi-circular channels 58 receive the upper halves of the plug axles 52. The outer ends of plug axles 52 have a larger diameter for stabilizing the plug 50 in the channels 54 and 58. The plug cavity 53 of lower portion 21 allows 360-degree rotation of the plug 50 with the prongs 51 about the plug axle 52 and allows the side of plug 50 opposite the plug prong side to be flush with the front wall of the bottom portion 21 when the prongs 51 are directed to the rear of the bottom portion 21. The forward portion of the top portion 20 also allows movement of plug 50, however, the top portion 20 does not include openings for the plug prongs 51. Instead, top portion 20 includes two prong stops 56 that stop the prongs at the rearwardly directed position, thus making the sides of plug 50 flush with the surfaces of top and bottom portions 20 and 21. Thus, as shown in FIG. 3B, the plug 50 rotates through the following three operational positions: a) stowed, non-charging; b) 90° from position (a), charging; c) 270° from position (a). 180° from position (b), charging. It is obvious to one of ordinary skill that various types of plugs or power input connecting devices could be used in place of the rotating plug 50 for connecting the battery unit 19 to the external AC power source.

Also shown in FIG. 3A, the circuits include a recharging 57 and discharging 68 circuit displaced on a printed circuit board (PCB)72. The printed circuit board 72 fits in the forward inner portion of bottom portion 21 around arm receiving notch 14, plug cavity 53 and prong cavity 55. Two brushes 59 on PCB 72 extend above the printed circuit board 72 adjacent to the semi-circular channels 54. The plug axle 52 maintains contact with the corresponding brushes 59.

As shown in FIG. 3A, the PCB 72 also includes four sets of two metallic pads 76a, b, 77a, b. A pad in set 76a connects to brush 59a and the other pad in set 76a connects to the battery recharging circuit 57. A pad in set 76b connects to brush 59b and the other pad in set 76b connects to recharging circuit 57. Two outputs from recharging circuit 57 connect to battery unit 19. One pad each from sets 77a, b connect to female charge connector 61 and the other pads of sets 77a, b connect to battery unit 19 or to discharge circuit 63. The discharge circuit 63 is connected if the battery unit 19 voltage is insufficient for the device 11. For example, the battery discharging circuit 68 is connected to regulate the discharge of the battery unit 19 to the female charge connector 61 from 5.25 to 4.75 volts.

As shown in FIGS. 3A, 9A, 9B and 10, the inner portion 15b of the rotating battery discharging switch 15 extends inside the battery pack 10. Portion 15b is positioned within the battery pack 10 above PCB 72 between pad sets 76a, b and 77a, b. Movement of arm portion 15a causes portion 15b to rotate inside battery pack 10.

The side of arm portion 15a facing the battery pack includes a channel 15d that extends from under portion 15b to under the connector mount 15c. The channel 15d receives wires 15e, f that connect the female charge connector 61 through the portion 15b to the sets of pads 77a, b, see FIG. 9A and 9B. One wire 15e connects to a pad of set 77a and the other wire 15f connects to a pad of set 77b.

Figure 9A:
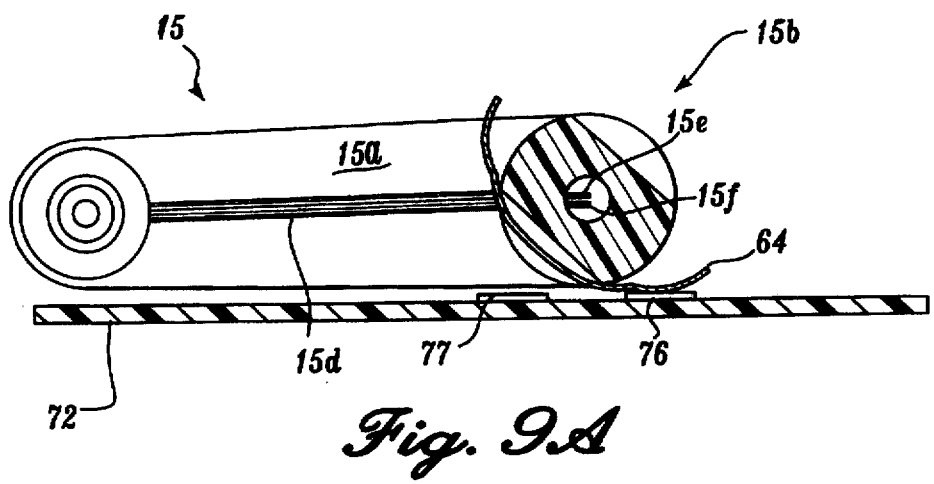
FIGS. 9A and 9B are partial, cross-sectional views of a preferred embodiment of the present invention.
Figure 9B:
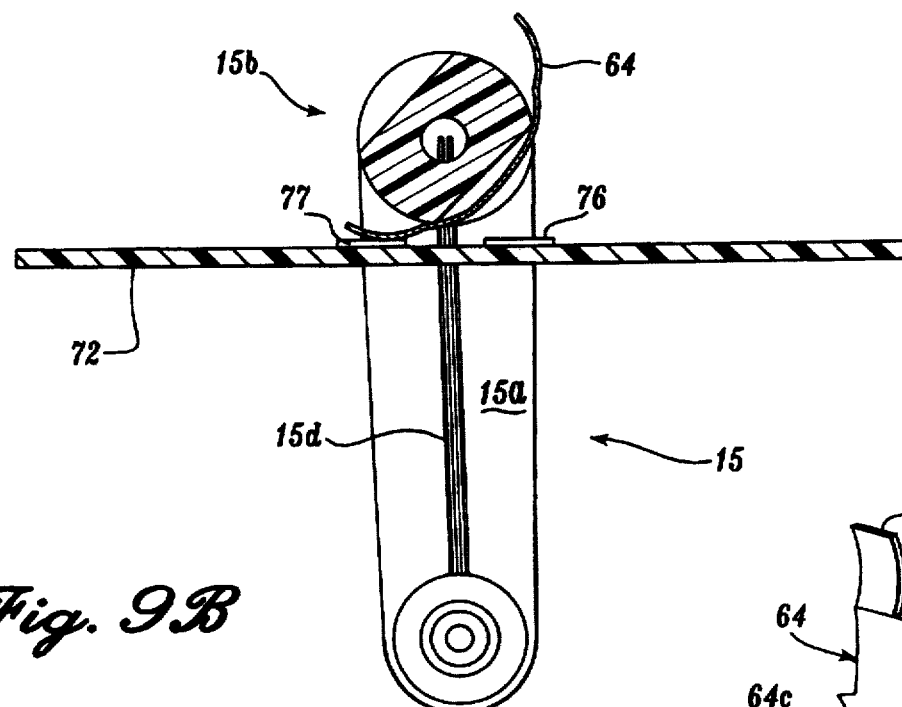
Figure 9C:
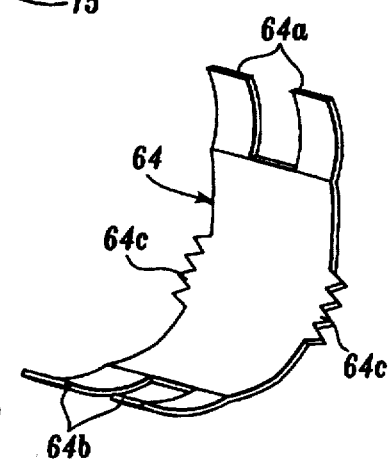
FIG. 9C is a perspective view of a preferred embodiment of the present invention.
Figure 10:
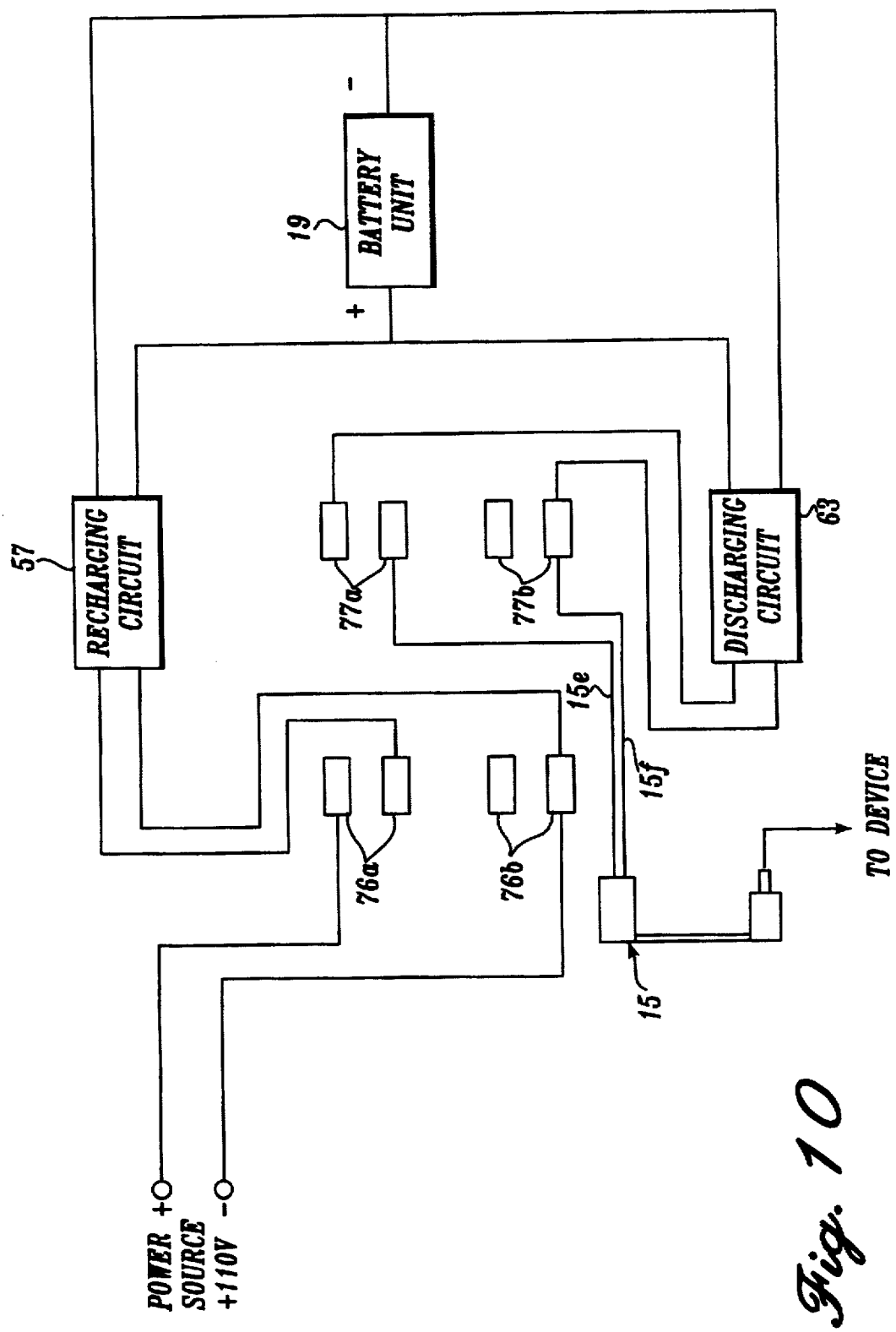
FIG. 10 is a block diagram of the circuit of the present.

Also shown in FIGS. 9A–C, the portion 15b of switch 15 includes two cavities 62 with sidewalls. The switch 15 also includes two flat metal circuit closing devices 64. As shown in FIG. 9C, the circuit closing devices 64 include two forward fingers 64a and two rear fingers 64b extending from opposing ends and teeth 64c. The teeth 64c are displaced along the longitudinal edges of the closing devices 64. The teeth 64c bite into receiving walls located on portion 15b. When the circuit closing devices 64 are connected to the portion 15b of switch 15, the fingers 64b extend in a tangential manner away from the portion 15b. The forward fingers 64a of the closing devices 64 are displaced relative to the sets of pads 76a, b forward of portion 15b of switch 15 and the rear fingers 64b of devices 64 are displaced relative to the sets of pads 77a, b rear of portion 15b. Rotation of battery discharging switch 15 rotates the portion 15b thus changing the relative position of the fingers of the closing devices 64 to the sets of pads on the circuit board 72. When the battery discharging switch 15 is in a position with the female charge connector 61 located inside the arm receiving notch 14, the forward fingers 64a of closing devices 64 electrically connect the two pads of set 76a and the two pads of set 76b, thus enabling the recharging circuit 57 and allowing outlet current to pass from the prongs 51 and the plug 50 through the recharging circuit 57 to the battery unit 19. When battery discharging switch 15 is in an extended position away from battery pack 10, the forward fingers 64a no longer connect the pads of sets 76a, b, thus disabling the recharging circuit 57, yet, the rear fingers 64b electrically connect the two pads of set 77a and the two pads of set 77b, thus enabling the battery discharging circuit 68 (see FIGS. 9A and 9B). The extended discharging switch 15 position allows the battery unit 19 to discharge through the battery discharging circuit 68 and the female charge connector 61 to the device 11.

The battery pack 10 also includes forward and aft vents that provide airflow through the interior of battery pack 10 for cooling the internal components during the different modes of operation. The vents also remove gasses that may build up during charging of the batteries. The forward vent is produced by the prong cut-out 55 on bottom 21 and no opposing closure from top portion 20. The second vent is a result of a longitudinal gap between the top portion 20 and bottom portion 21 at the second horizontal gap.

Additionally, the recharging circuit 57 includes two light-emitting diodes (LED) 74 and 75. Diode 74 is connected to the recharging circuit 57 and the battery unit 19. The LEDs are disposed through separate apertures at the forward portion of top portion 20. LED 74 illuminates when the battery unit 19 is recharging from an external power source connected to plug 50. LED 75 is connected to battery unit 19 and illuminates when the batteries of battery unit 19 are at or below a predetermined voltage level. The predetermined voltage level for the present invention is 5.36 volts. Illumination of LED 75 indicates to the user that lengthy, power hungry operations are not advised under present battery power. It can be appreciated to one of ordinary skill that the illumination voltage value can be set to a value compatible with the power requirements of the computer peripheral device.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A rechargeable battery pack for holding at least one battery and for connecting to a battery powered device for supplying power thereto; the battery pack comprising:
   (a) a case for holding the at least one battery;
   (b) a recharging means disposed in said case for recharging the at least one battery;
   (c) a device powering means for powering the battery powered device using the at least one battery; and
   (d) an operation control means for controlling the recharging means and the device powering means, wherein said operation control means includes a first operating mode enabling the recharging means and disabling the device powering means and a second operating mode for enabling the device powering means and disabling the recharging means, and wherein said operation control means comprises a controlling arm rotatably connected to said case for selecting the operating modes and said controlling arm being rotatable from a first position for activating the first operating mode to a second position for activating the second operating mode.

2. A rechargeable battery pack for holding at least one battery and for connecting to a battery powered device for supplying power thereto; the battery pack comprising:
   (a) a case for holding the at least one battery;
   (b) a recharging circuit connected to said at least one battery and disposed in said case;
   (c) a plug including first and second prongs spaced apart from one another and generally parallel to each other, said plug being rotatably connected to one end of said case, wherein said plug is rotatable from a stowed position having the plug mounted flush with the case and the prongs recessed in the case, to a first extended position with said prongs projecting from the case wherein said extended position is substantially orthogonal to said stowed position, and to a second extended position with said prongs projecting from the case, wherein said second extended position is substantially orthogonal to the stowed position and about 180° different from the first extended position, said prongs being electrically connected to said recharging circuit, the total range of rotation of the plug is about 270°; and
   (d) a battery discharging means connected to the at least one battery, wherein the battery discharging means is electrically connectable to the battery powered device for allowing the battery to discharge to the computer peripheral device and the battery discharging means includes a battery discharging arm connected to the at least one battery, wherein the battery discharging arm is electrically connected to the battery powered device for allowing the battery to discharge to the computer peripheral device.

3. A rechargeable battery pack for holding at least one battery and for connecting to a battery powered device for supplying power thereto; the battery pack comprising:
   (a) a case for holding the at least one battery;
   (b) a recharging circuit connected to said at least one battery and disposed in said case;
   (c) a plug including first and second prongs spaced apart from one another and generally parallel to each other, wherein said plug is electrically connected to said recharging circuit;
   (d) a battery discharging arm connected to the at least one battery, wherein said arm is connectable to the battery powered device for allowing the at least one battery to power the battery powered device; and
   (e) securing means for temporarily securing the battery pack to a battery powered device.

4. The battery pack of claim 3, wherein said securing means includes a rear latch securable to at least one ridge on the surface of the battery powered device.

5. The battery pack of claim 3, wherein said securing means includes at least one opposing ridge for mounting against said at least one ridge on the battery powered device for limiting motion of the battery pack relative to the battery powered device.

6. The battery pack of claim 3, wherein said battery discharging arm further comprises an operation control means for controlling the electrical connection between the plug and the recharging circuit and the connection between the battery discharging arm and the at least one battery, wherein said operation control means includes a first operating mode enabling the recharging circuit and disabling the battery discharging arm and a second operating mode for enabling the battery discharging arm and disabling the recharging circuit.

7. The battery pack of claim 6, wherein the battery discharging arm is located in a first rotatable position in the first operating mode and in a second rotatable position in the second operating mode.

8. The battery pack of claim 7, wherein the securing means comprises the battery discharging arm in the second rotatable position.

9. The battery pack of claim 3, further comprising at least two cooling vents located on the case for allowing airflow through the case, thus cooling the components inside the case and exhausting gasses.

10. The battery pack of claim 3, further comprising a LED connected to the at least one battery for illuminating when the at least one battery is at or below a predetermined level.

11. The battery pack of claim 10, wherein said predetermined level is 5.36 volts.

12. The battery pack of claim 3, further comprising an LED connected to the recharging circuit and the at least one battery for illuminating when the at least one battery is recharging.

13. The battery pack of claim 3, wherein said plug being rotatably connected to said case and from a stowed position having the plug mounted flush with the case and the prongs recessed in the case, to a first extended position with said prongs projecting from the case, wherein said extended position is substantially orthogonal to said stowed position, and to a second extended position with said prongs projecting from the case, wherein said second extended position is substantially orthogonal to the stowed position and at least 180° different from the first extended position, said prongs being electrically connected to said recharging circuit, the total range of rotation of the plug is at least 270°.

* * * * *